US007478334B2

(12) United States Patent
Chen et al.

(10) Patent No.: US 7,478,334 B2
(45) Date of Patent: Jan. 13, 2009

(54) FOLDING TEXT IN SIDE CONVERSATIONS

(75) Inventors: Yen Fu Chen, Austin, TX (US); John H. Handy-Bosma, Cedar Park, TX (US); Mei Y. Selvage, Austin, TX (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/039,532

(22) Filed: Jan. 20, 2005

(65) Prior Publication Data

US 2006/0161851 A1 Jul. 20, 2006

(51) Int. Cl.
*G06F 3/00* (2006.01)
*G06F 3/048* (2006.01)

(52) U.S. Cl. .................. 715/759; 715/751; 715/753; 715/756

(58) Field of Classification Search .......... 715/753, 715/756, 758, 759
See application file for complete search history.

(56) References Cited

U.S. PATENT DOCUMENTS

| 5,442,742 | A | 8/1995 | Greyson et al. |
| 6,279,017 | B1 | 8/2001 | Walker |
| 6,683,631 | B2 | 1/2004 | Carroll |
| 6,772,195 | B1 * | 8/2004 | Hatlelid et al. ............... 709/204 |
| 7,024,456 | B1 | 4/2006 | Simonoff |
| 7,124,164 | B1 * | 10/2006 | Chemtob .................. 709/204 |
| 7,124,167 | B1 | 10/2006 | Bellotti et al. |
| 2003/0229845 | A1 | 12/2003 | Salesin et al. |
| 2004/0109023 | A1 * | 6/2004 | Tsuchiya .................. 345/758 |
| 2005/0102628 | A1 | 5/2005 | Salesin et al. |
| 2006/0161842 | A1 | 7/2006 | Chen et al. |

OTHER PUBLICATIONS

William Wright and Dana Moore, "Instant Messaging A Programmer's Tool? Jabber and lightweight languages do the trick," Dr. Dobb's Journal, pp. 48-53, Mar. 2004.

* cited by examiner

*Primary Examiner*—Steven P. Sax
*Assistant Examiner*—Grant D Johnson
(74) *Attorney, Agent, or Firm*—Francis Lammes; Stephen J. Walder, Jr.; Libby Z. Handelsman

(57) ABSTRACT

An example of a solution provided here comprises receiving a signal for sending in a side conversation, and in response to the signal for sending, sending a first portion of text, in a side conversation. The first portion of text is new, and the first portion of text is not necessarily revealed to some participants.

11 Claims, 5 Drawing Sheets

FOLDING TEXT IN SIDE CONVERSATIONS

CROSS-REFERENCE TO RELATED APPLICATION, AND COPYRIGHT NOTICE

The present patent application is related to a co-pending patent application entitled Folding Text, filed on even date herewith, assigned to the assignee of the present patent application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling and digital communication, and more particularly to software, systems, and methods of messaging and collaboration.

BACKGROUND OF THE INVENTION

When collaborating on a project, it is often difficult to communicate efficiently, or to allocate information efficiently. For example, consider the use of instant messaging (IM) applications as conference tools to discuss issues and share ideas or information. A large number of participants in an IM conference is not uncommon, the conference time can be lengthy, and many topics may be covered. Conventional IM applications do not provide integrated side conversations when a user needs to discuss something with a certain subgroup of people. The conventional solution is to have a separate window for side conversations, but the side-transcripts are separate from the main IM transcripts. Hence, relevant information can be hard to locate and an accurate transcript of the group's conversation is not maintained. Users may want to have a side conversation without revealing the information to all users. Conventional solutions do not integrate security restrictions into group conversations.

Thus there is a need for systems and methods to facilitate side conversations.

SUMMARY OF THE INVENTION

In one illustrative embodiment, a method is provided for real-time, or near-real-time, communication in a network environment. The illustrative embodiment receives, during an instant messaging session of an instant messaging application having a plurality of participants in the instant messaging session, a signal for sending an instant message in a side conversation to at least one participant in the plurality of participants. In response to the signal for sending, the illustrative embodiment sends a first message portion, in the side conversation. In the illustrative embodiment, the first message portion is a new message portion that has not been part of the instant messaging session. In the illustrative embodiment, the first message portion is not revealed to at least one other participant in the plurality of participants. The illustrative embodiment displays a clue about the first message portion to the at least one other participant in the plurality of participants to which the first message portion is not revealed, in a textual representation of the instant messaging session on a computing device associated with the at least one participant. The illustrative embodiment generates, for each of the participants in the plurality of participants, a transcript of the instant messaging session. In the illustrative embodiment, a transcript for the at least one other participant to which the first message portion is not revealed is a redacted transcript that does not include the side conversation in the redacted transcript. The illustrative embodiment stores, in a central server, a common transcript of the instant messaging session that includes the side conversation. In the illustrative embodiment, the clue comprises an identification of a participant in the side conversation. In the illustrative embodiment, the first message portion is sent to the at least one participant in the plurality of participants as a folded message in which a content of the folded message is not revealed to one or more participants in the plurality of participants. In the illustrative embodiment, the first message portion is sent to one of a participant in the plurality of participants as an unfolded message. The illustrative embodiment receives specifications of access limits. In the illustrative embodiment, the access limits specify operations that each participant in the plurality of participants may perform with regard to the side conversation. In the illustrative embodiment, at least two participants in the plurality of participants have access limits that permit the at least two participants to view the side conversation but one of the at least two participants has access rights that limit other operations that may be performed by the participant with regard to the side conversation. The illustrative embodiment sets access limits, in the side conversation.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Folding" means concealing or obscuring from the view of some users or all users.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
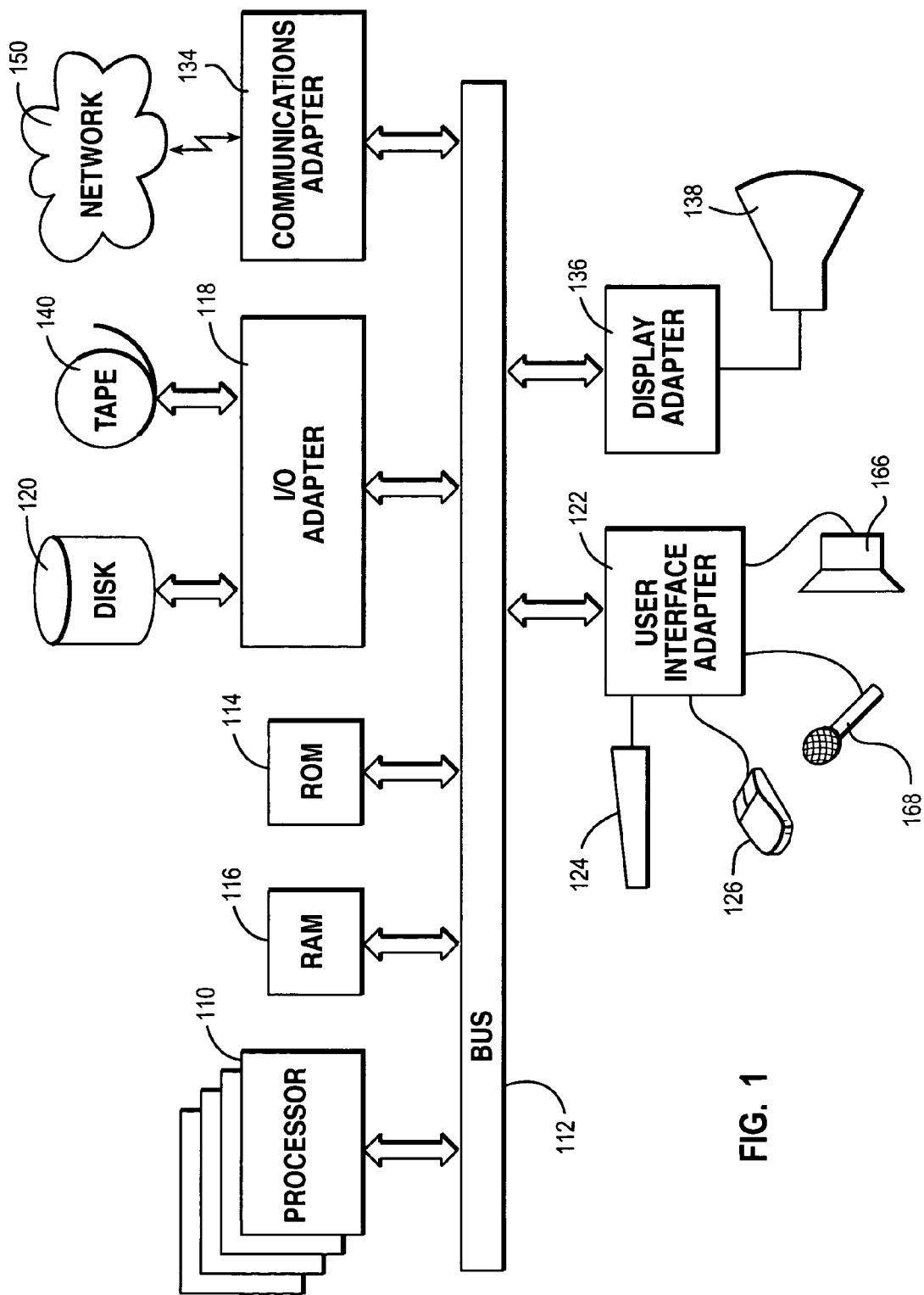
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

FIGS. 2A-2E illustrate examples of folding text, according to the teachings of the present invention. FIGS. 2A-2E each illustrate an example of a screen shot from a messaging application. FIGS. 2A-2E each illustrate screen 200, having a menu bar 210A and a scroll bar 210B. Screen 200 displays text (such as text at 201 in FIG. 2E). (In other scenarios, users of collaboration software may utilize an interface similar to screen 200, in working together on software code, a reusable component of web services, a transcript of a speech, a document, etc.) Here is an overview of major features illustrated in these examples in FIGS. 2A-2E:

Users send folded text and define access rights on folds. This feature allows users to have a side conversation, either allowing it or not allowing it to be opened by all participants (see FIGS. 2A-2C). The folded text appears in the main transcript. FIG. 2D shows an example of defining a portion of text, lines 212-216, for folding. Then lines 212-216 are hidden (see FIG. 2E). The view in FIG. 2E is suitable for sending in a side conversation, for example.

Figure 2A:
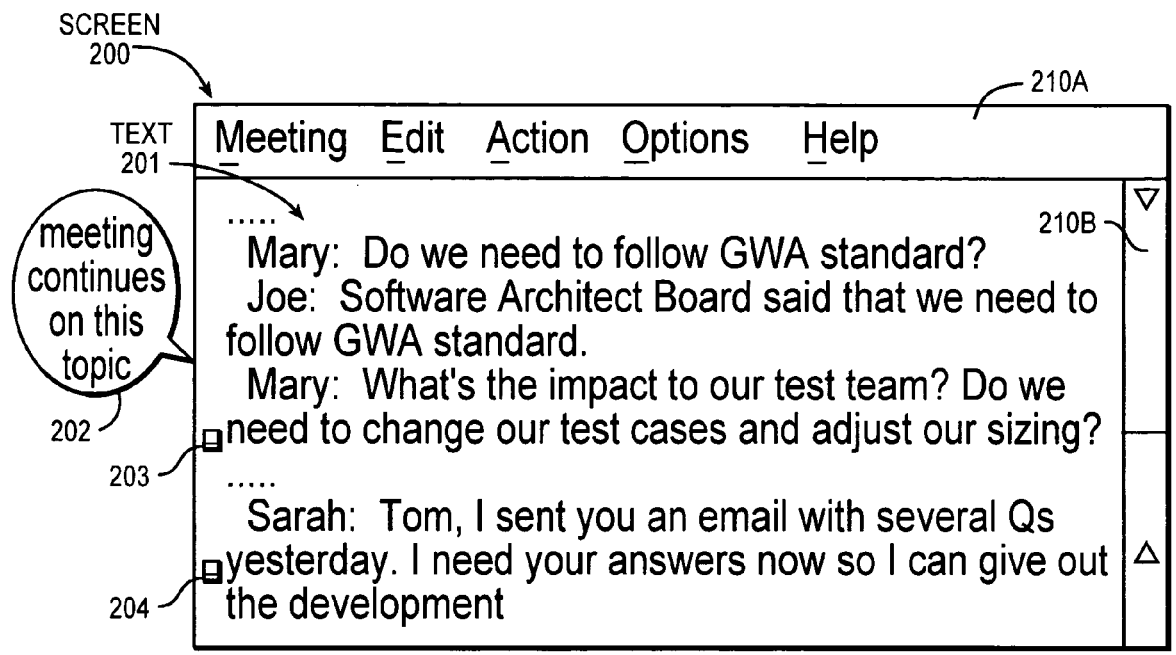
FIG. 2A illustrates an example of defining folded text for sending in a side conversation.

FIG. 2A illustrates an example of defining folded text for sending in a side conversation. FIG. 2A shows Sarah's view. Sarah is a user who defines folded text at 204, for sending in a side conversation with Tom. (Concerning side conversations, see also FIGS. 3 and 4.)

Figure 2B:
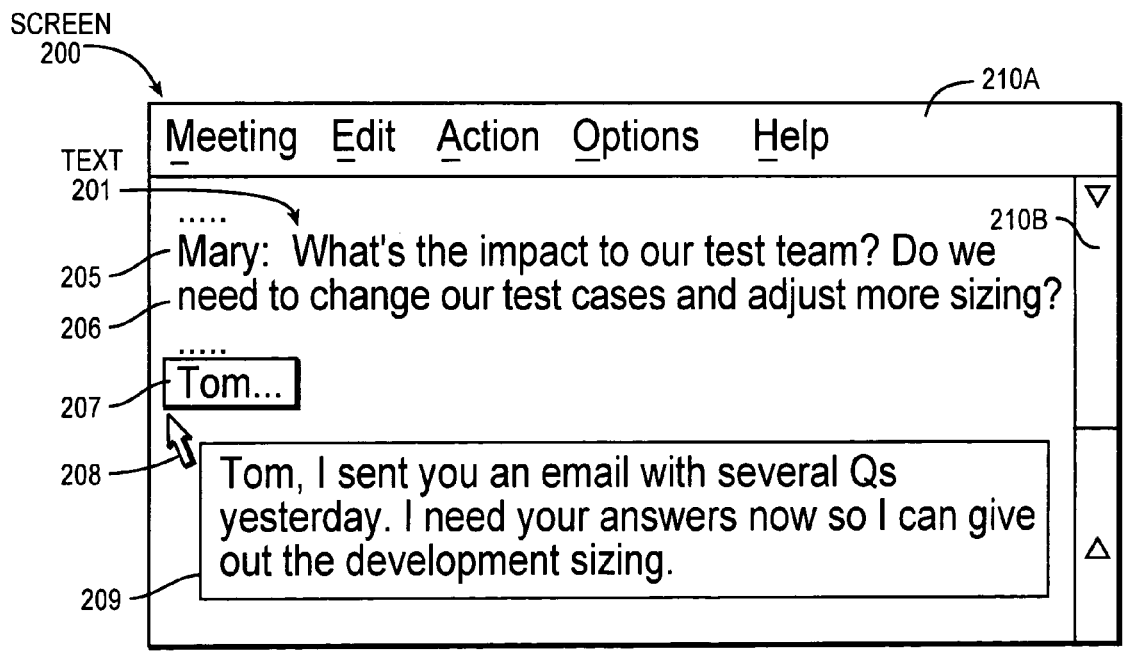
FIG. 2B illustrates an example of receiving folded text in a side conversation.

FIG. 2B illustrates an example of receiving folded text in a side conversation. FIG. 2B shows Tom's view. Tom is a user who receives folded text at 209, in a side conversation with Sarah. Button 207 gives a clue as to what has been folded or hidden. Tom can see folded text at 209, by moving cursor 208 (or a mouth symbol, etc.) over button 207, for example.

Figure 2C:
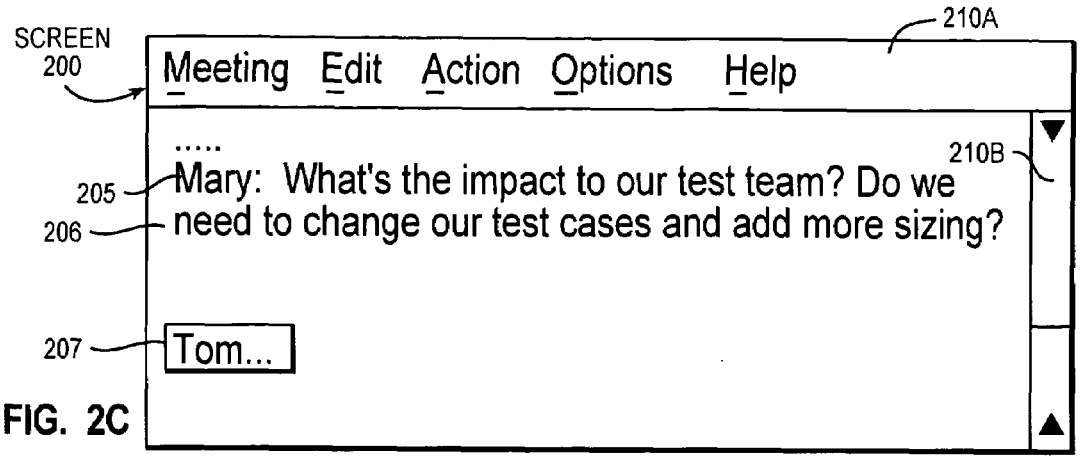
FIG. 2C illustrates another example involving a side conversation.
Figure 2D:
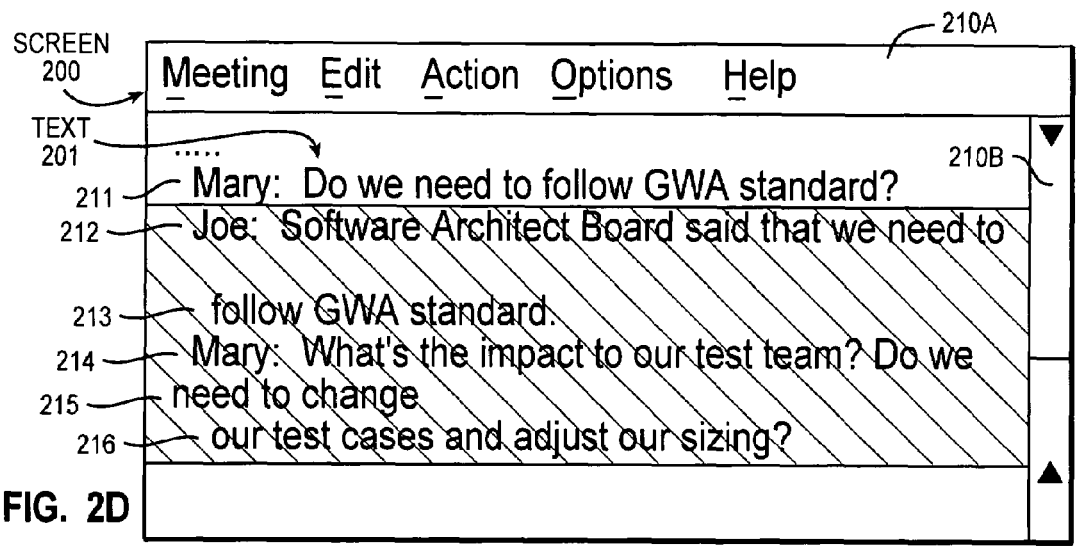
FIG. 2D shows an example of defining a portion of text for folding.
Figure 2E:
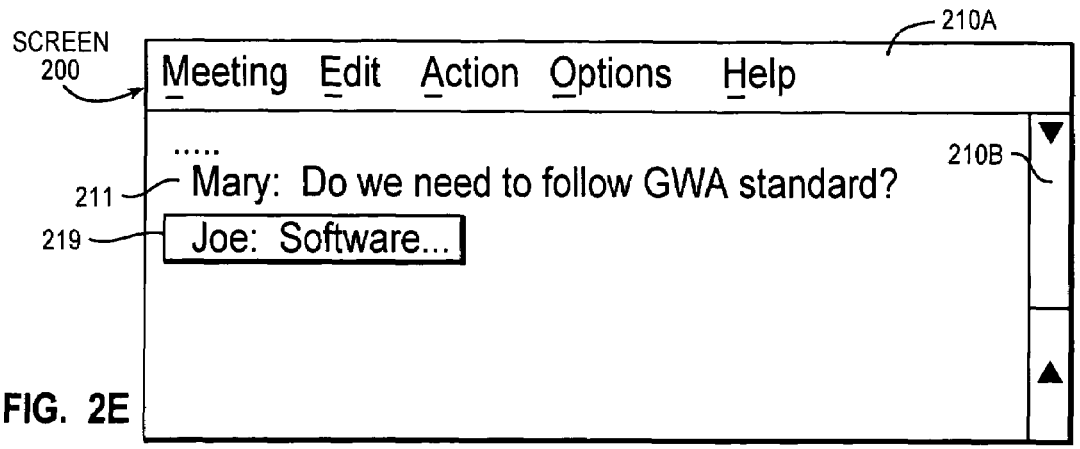
FIG. 2E shows a view after reversibly hiding a portion of text.

FIG. 2C illustrates another example involving a side conversation. FIG. 2C shows other participants' view (participants in a conference other than Sarah and Tom).

Users send folded text and define security rights on folds. Sending the folded text is like a side conversation, or secret message. It may be opened by some or all participants. The folded text appears in the main transcript. Users can send a folded message as a turn. When you have five people in an IM conference, for example, a user (e.g. Sarah in FIG. 2A) can type a unique text (e.g. text at 204 in FIG. 2A) and then send it to one or more participants in the conversation. A button (e.g. buttons at 203 and 204) may appear, showing the new text in the side conversation, and where it fits into the main conversation. This side conversation is separate from the main meeting symbolized by bubble 202.

Once folded text is sent in the side conversation, it may be opened (text at 209 in FIG. 2B) to some automatically and not opened to others. It may be sent folded to all, but with the intended recipients' names or other identifiers (such as 207 in FIG. 2B). Not everyone needs to see it, but they can open and see it if they want to. Users can also implement secured folds, which mean only some people can see. For instance, a user would want to secure the folded text if there is some information that needs to be protected, such as security info, logins, etc. Secured folds are like whispering in a conversation or speaking in a secret code. One option is to fold the text and secure it, either with a password or by providing access only to specific people or roles, which is enforced on the system level. In the alternative, users could also encrypt the text within the fold as an additional security measure. Only intended receipts can decrypt it. Optionally, Sarah can use a password to secure the message (e.g., text at 204 in FIG. 2A and text at 209 in FIG. 2B) so only Tom can open it, but the text at 209 is still part of the main transcript.

In summary, FIGS. 2A-2C illustrate an example where a messaging application receives input, defining a portion of text (e.g. typing text at 204 in FIG. 2A), for folding. If a signal for sending in a side conversation is received, the messaging application sends the portion of text at 209, in a side conversation, in response to the signal. The portion of text at 209 is new and is not necessarily revealed to some participants. The messaging application may receive specifications of access limits for text at 209, and set access limits.

Figure 3:
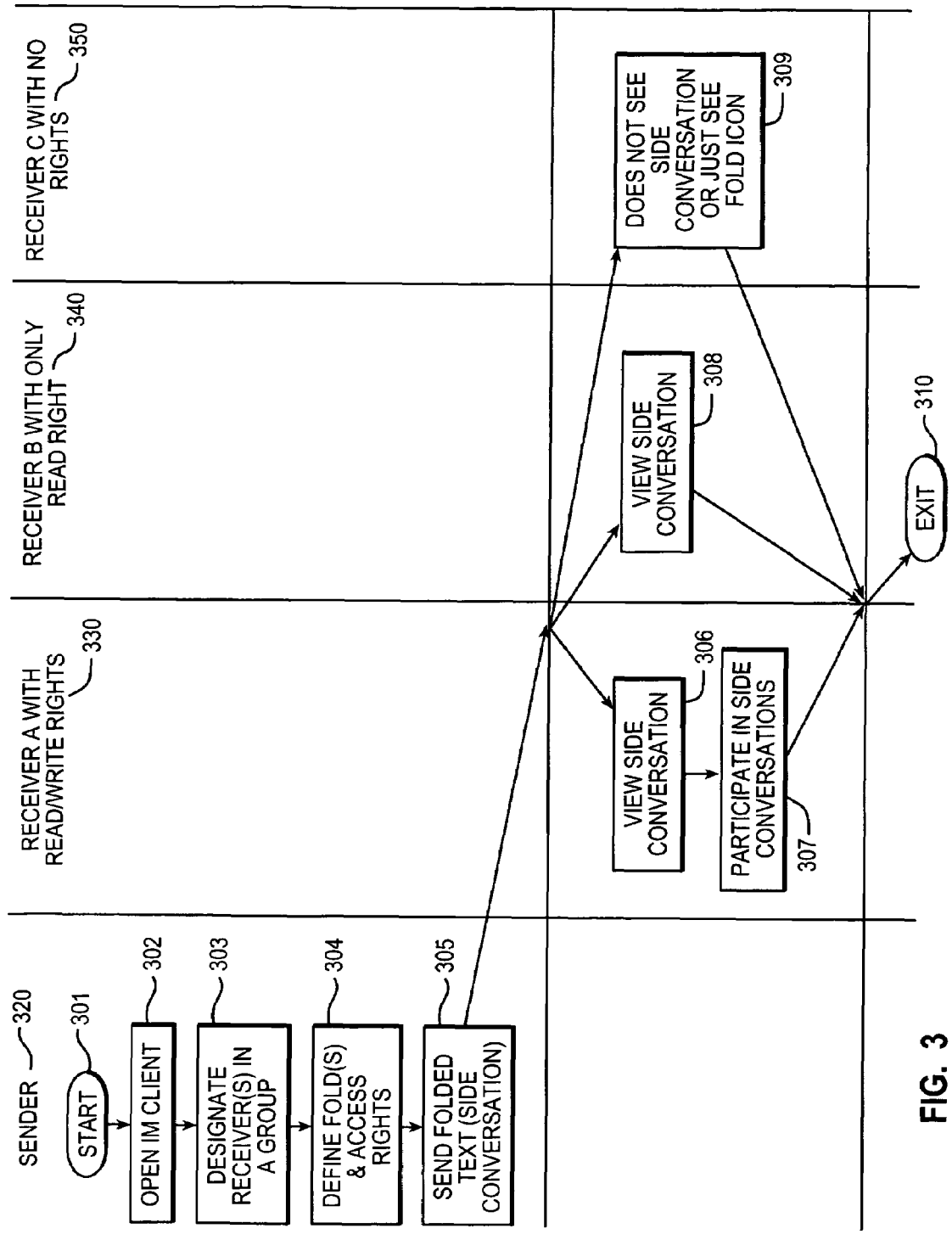
FIG. 3 is a flow chart with swim lanes, illustrating an example of a communication method, according to the present invention.

FIG. 3 is a flow chart with swim lanes 320, 330, 340, and 350, illustrating an example of a communication method, according to the present invention. In this example, there are four different actors, one in each swim lane, each with different access rights to the contents of a side conversation initiated by Sender in lane 320. The example starts at Block 301 and continues at Block 302 with opening an IM client. At 303 the sender designates receivers such as Receiver A in Lane 330 and Receiver B in Lane 340. At Block 304 the sender defines folding text, for example typing text (e.g. text at 204 in FIG. 2A) for sending (Block 305) to one or more participants in the side conversation.

At Block 304 the sender may restrict access or implement secured folds, which mean only some people can see. At Block 304 the messaging application receives the signal to fold the text and secure it, for example with a password or by providing access only to specific people or roles, which is enforced on the system level. FIG. 3 provides an example of setting access limits, in the side conversation, as follows. Receiver A in Lane 330 has read and write rights. Receiver B in Lane 340 has only read rights. Receiver C in Lane 350 has no rights.

On the other hand, if no command is received to restrict access, the path is taken directly to 305. At Block 305, the messaging application sends folded text, in response to a signal for sending in a side conversation.

At Block 306, Receiver A in Lane 330 views the side conversation. At Block 307, Receiver A in Lane 330 fully participates in the side conversation, by writing or otherwise contributing content. At Block 308, Receiver B in Lane 340 has only read rights, and views the side conversation. For example, Receiver B's client displays a view such as FIG. 2B. At Block 309, Receiver C in Lane 350 has no rights, and thus does not view the side conversation. As an alternative, Receiver C views only a clue such as a fold icon. For example, Receiver C's client displays a clue 207 about a portion of text, in a view such as FIG. 2C.

After operations at Blocks 306-309, the example ends at Block 310.

Regarding FIG. 3, the order of the operations described above may be varied. For example, putting Block 304 ("Define fold(s) & access rights") first is within the practice of the invention. Blocks in FIG. 3 could be arranged in a somewhat different order, but still describe the invention. Blocks could be added to the above-mentioned diagram to describe details, or optional features; some blocks could be subtracted to show a simplified example.

Figure 4:
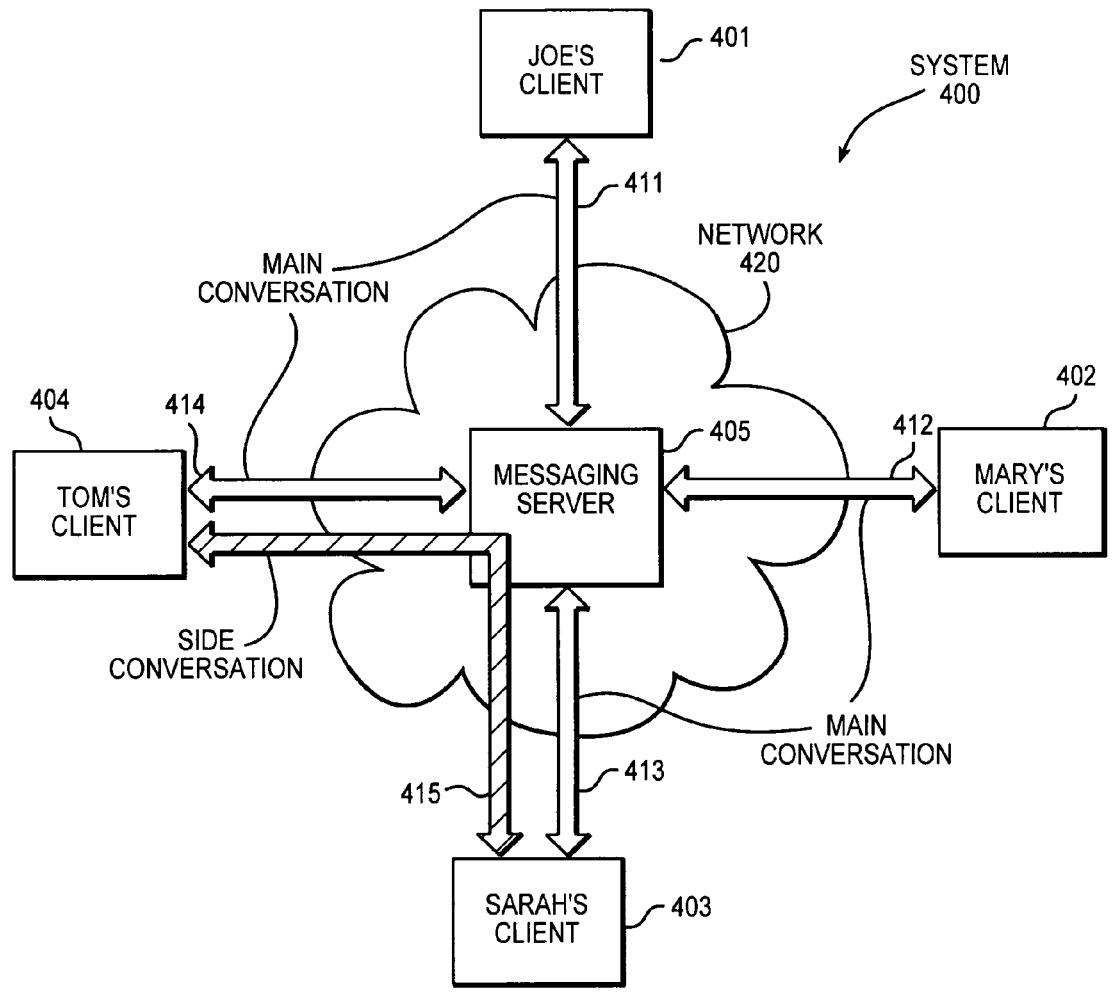
FIG. 4 is a block diagram illustrating an example of a communication method and communication system.

FIG. 4 is a block diagram illustrating an example of a communication method and messaging system or real-time communication system 400. Users of clients 401-404 may participate in an instant-messaging conference (a conference symbolized in FIG. 4 by "main conversation" arrows 411-414). In another scenario, users of clients 401-404 may collaborate on a document, which may be stored on server 405. Arrow 415 symbolizes a side conversation between users of clients 403 and 404, separate from the main conversation symbolized by arrows 411-414 (as described in connection with FIGS. 2A-2B).

In the example in FIG. 4, clients 401-404 serve as means for receiving a signal for sending in a side conversation. Referring again to FIGS. 2A-2E, for example, menu bar 210A displays and invokes, in response to user inputs, a main level of user commands. Menu bar 210A also invokes additional pull-down menus. A signal for sending in a side conversation may be received through a user's selection of a menu item. These signals may be user event signals, such as mouse-button clicks or drags.

In the example in FIG. 4, Clients 401-404, server 405, and network 420 serve as means for sending a first portion of text, in a side conversation. Clients 401-404, server 405, and network 420 serve as means for receiving specifications of access limits, and means for setting access limits, in a side conversation. For example, in the side conversation 415, system 400 may provide access only to specific users, such as Tom at 404 and Sarah at 403. Clients 401-404, server 405, and network 420 serve as means for providing in the side conversation one or more features chosen from graphics, audio, motion video, and an embedded application. Clients 401-404 serve as means for displaying a clue about the first portion of text. The clue has one or more features chosen from: a color, an image, and a shape; whereby some information about the first portion of text is conveyed to some participants.

Continuing with details of FIG. 4, consider features that may be included in this example. In side conversation 415, folded information can be reconciled with or made part of a single, common transcript for those participants granted real-time or post-hoc access to the side conversation. All other participants will possess what might be thought of as a "redacted" transcript in which side conversations are removed. This is a distinction from conventional solutions such as whispers. Whispers in IM clients and chat rooms are not made part of a larger chat transcript or group conversation.

In FIG. 4, a subgroup of people is having a side conversation 415. There are different fold views for different participants depending on their rights. It is very useful to share screen shots or embedded applications. System 400 can be configured so that side conversations are showing up within main conversation in context; or separate out in an attached window. Local transcript includes all information to which a participant is granted access, including all side conversations. Optionally, a common transcript can be saved to a central repository. So some participants may possess a smaller local version that excludes conversation to which they are not privy.

Initiate conversation with selected participants from a larger conversation. that conversation may occur in a separate window, or be made part of the same larger chat window. Optionally, System 400 provides the ability to initiate a side conversation and limit access rights for participants in the larger conversation. Those in the side conversation 415 would typically see each turn or sub-turn as open text, while others who are participants in the larger conversation and not the side conversation 415 preferably see a fold or other visual clue (such as clue 207 in FIG. 2C) that a side conversation exists. A visual clue or "fold marker" may include a hotspot, icons for participants, links or similar items. Consider these alternatives in handling side conversation 415: others see the clue, but cannot access the side conversation 415. Others can see the clue, but would need to request access to the side conversation 415 before seeing the side conversation 415 (other processing steps could be included before permission is granted). Perhaps others cannot see the clue.

Participants in the larger conversation could optionally configure their IM client to show everything they are allowed to see as open, unfolded text. Side conversations provide the ability to have separate conversations that are kept as part of an overall, centrally-managed transcript or kept as a transcript for those IM clients that are granted access to the side conversation. A receiver's view may show a fold marker for each turn or sub-turn in a folded side conversation to provide a visual clue that a side conversation has happened. Users may configure in advance, or on a per-conversation basis, whether other participants in the larger conversation can see you are having a side conversation. One can retrospectively grant access to a side conversation, so a new participant can be brought in and caught up with the conversation. Users may make a side conversation "catch up" feature contingent on agreement of all participants in side conversation. Users may fold screen shots or similar rich binary experiences such as voice or motion video and send as a turn in a side conversation to selected participants. Such a feature may be enhanced by specific iconic representations of such non-textual content.

Clients 401-404 and server 405 may be implemented on a variety of hardware platforms (see FIG. 1 and its written description). Clients 401-404 may be implemented with hand-held wireless communications devices, notebook computers, personal computers, or workstations, for example.

Clients 401-404 and server 405 may be implemented with various software having messaging functions, such as software products sold under the trademarks LOTUS NOTES and LOTUS DOMINO by IBM, for example. Another implementation option is free, open-source software available under the trademark JABBER from Jabber Software Foundation. JABBER is well-suited for building custom functionality on top of the core protocols. Examples are described in an article by William Wright and Dana Moore, "Instant Messaging A Programmer's Tool? Jabber and Lightweight Languages Do the Trick," *Dr. Dobb's Journal*, pages 48-53, March 2004, herein incorporated by reference. The article examines the JABBER client-side protocol, and use of JABBER with various programming languages including Python, Perl, and Ruby. The JABBER protocol is described as "a bidirectional XML stream exchanged between the IM client and Jabber server."

In conclusion, we have shown examples of systems and methods of facilitating side conversations. We have provided detailed examples involving instant messaging.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an" the same holds true for the use in the claims of definite articles.

We claim:

1. A method of real-time, or near-real-time, communication in a network environment, said method comprising:

receiving, during an instant messaging session of an instant messaging application having a plurality of participants in the instant messaging session, a signal for sending an instant message in a side conversation to at least one participant in the plurality of participants;

in response to said signal for sending, sending a first message portion, in the side conversation, wherein said first message portion is a new message portion that has not been part of the instant messaging session, and wherein said first message portion is not revealed to at least one other participant in the plurality of participants;

displaying a clue about said first message portion to the at least one other participant in the plurality of participants to which the first message portion is not revealed, in a textual representation of the instant messaging session on a computing device associated with the at least one participant;

generating, for each of the participants in the plurality of participants, a transcript of the instant messaging session, wherein a transcript for the at least one other participant to which the first message portion is not revealed is a redacted transcript that does not include the side conversation in the redacted transcript;

storing, in a central server, a common transcript of the instant messaging session that includes the side conversation, wherein the clue comprises an identification of a participant in the side conversation, wherein the first message portion is sent to the at least one participant in the plurality of participants as a folded message in which a content of the folded message is not revealed to one or more participants in the plurality of participants, and wherein the first message portion is sent to one of a participant in the plurality of participants as an unfolded message;

receiving specifications of access limits, wherein the access limits specify operations that each participant in the plurality of participants may perform with regard to the side conversation, and wherein at least two participants in the plurality of participants have access limits that permit the at least two participants to view the side conversation but one of the at least two participants has access rights that limit other operations that may be performed by the participant with regard to the side conversation; and setting access limits, in said side conversation.

2. The method of claim 1, wherein said clue has one or more features chosen from a color, an image, and a shape, whereby some information about said first message portion is conveyed to the at least one participant in the plurality of participants.

3. The method of claim 1, further comprising:

allowing a new participant to have access to said side conversation, whereby said new participant is brought into said side conversation after the side conversation begins.

4. The method of claim 1, further comprising:

providing different views of said side conversation for different participants of the plurality of participants depending on said access limits.

5. The method of claim 1, wherein said first message portion further comprises one or more features chosen from:

graphics, audio, motion video, and an embedded application.

6. The method of claim 1, wherein the clue is associated with the folded message, and wherein the clue includes an identifier indicating at least one intended recipient of the folded message.

7. The method of claim 1, wherein the folded message is a secure folded message having a security feature enabled such that only an intended recipient of the folded message may access contents of the folded message.

8. The method of claim 1, wherein the at least one participant in the plurality of participants is not permitted to access content of the folded message until the at least one participant requests access and is granted access to the content of the folded message.

9. The method of claim 1, wherein the access limits for a first participant in the at least two participants specifies that the first participant may read messages sent as part of the side conversation and write messages to be sent as part of the side conversation, and wherein the access limits for a second participant in the at least two participants specifies that the second participant can only read messages sent as part of the side conversation.

10. The method of claim 9, wherein access limits for a third participant in the plurality of participants specifies that the third participant can neither read messages in the side conversation nor write messages to be sent in the side conversation.

11. The method of claim 10, wherein a view of the textual representation of the instant messaging session is different on a computing device associated with the second participant and a computing device associated with the third participant by virtue of the application of the access limits for the second participant and the access limits for the third participant.

* * * * *